United States Patent [19]

Bessler et al.

[11] 4,046,521
[45] Sept. 6, 1977

[54] DISTILLATE FUEL CONTAINING DEHAZING COMPOSITIONS

[75] Inventors: Donald U. Bessler; Kenneth J. Tacchi, both of St. Louis, Mo.

[73] Assignee: Petrolite Corporation, St. Louis, Mo.

[21] Appl. No.: 563,649

[22] Filed: Mar. 31, 1975

[51] Int. Cl.² ............................................. C10L 1/18
[52] U.S. Cl. ........................................... 44/62; 44/78
[58] Field of Search ..................... 44/62, 78, 63, 58; 260/59 EP, 53 EP

[56] References Cited

U.S. PATENT DOCUMENTS

| | | | |
|---|---|---|---|
| 2,060,410 | 11/1936 | Balle | 260/53 EP |
| 2,453,850 | 11/1948 | Mikeska et al. | 44/78 |
| 2,454,541 | 11/1948 | Bock et al. | 260/53 EP |
| 2,658,885 | 11/1953 | D'Alelio | 260/53 EP |
| 2,659,710 | 11/1953 | Martin | 260/53 EP |
| 2,736,702 | 2/1956 | Smith et al. | 44/62 |
| 2,760,852 | 8/1956 | Stevens et al. | 44/78 |
| 3,252,850 | 5/1966 | Partansky | 260/59 EP |
| 3,485,797 | 12/1969 | Robins | 260/59 EP |
| 3,538,040 | 11/1970 | Grazen | 260/59 EP |
| 3,577,437 | 5/1971 | Le Blanc | 260/59 EP |

Primary Examiner—Daniel E. Wyman
Assistant Examiner—Mrs. Y. Harris-Smith
Attorney, Agent, or Firm—Sidney B. Ring; Hyman F. Glass

[57] ABSTRACT

This invention relates to compositions which are the reaction products of phenol-formaldehyde resins, α-olefin epoxides derived from α-olefins of 4 or more carbons and alkylene oxides such as ethylene and propylene oxides; and to the use of these compositions as dehazers for petroleum distillates.

11 Claims, No Drawings

DISTILLATE FUEL CONTAINING DEHAZING COMPOSITIONS

This invention relates to dehazers for distillate fuels such as jet fuels and gasoline.

Distillate fuels, such as gasoline and jet fuels are compounded with a variety of additives. Recently, there has been a concerted effort to provide detergent additives which not only maintain a cleaner carburetor but also cleaner manifold ports and valves. Because of the detergent nature of these additives, water tolerance problems have arisen. Water tolerance is the rate of separation after agitation between an aqueous phase and the organic phase, and the retention of water in the organic phase so as to retain a hazy appearance.

Representative examples of fuel additives employed in distillate fuels are described in U.S. Pat. Nos. 3,438,757, 3,578,422, 3,655,351, British Pat. No. 1,252,404 and elsewhere. These are by reference incorporated into the present application as if part hereof.

I have now discovered that the addition of compositions of this invention to distillate fuels, particularly those fuels containing detergent additives, act as dehazers, i.e., are capable of removing the hazy appearance.

A wide variety of distillate petroleum fuels can be dehazed according to this invention. In general, the fuels employed are compositions comprising straight chain paraffins, branched chain paraffins, olefins, aromatic hydrocarbons and naphthenic hydrocarbons. These fuels will generally have initial boiling points of 100° F, and final boiling points of 425° F. (ASTM D-86) The specifications for conventional gasolines are set forth in ASTM D-439-60T. The fuel components may be derived by any of the conventional refining and blending processes, such as straight run distillation, thermal cracking, hydrocracking, catalytic cracking and various reforming processes. Preferred fuels have from 20 to 50 volume percent aromatic content.

The dehazing compositions of this invention are phenol-formaldehyde resins which are first reacted with α-olefin epoxides and then reacted with alkylene oxides such as ethylene oxide, propylene oxide, or combinations thereof. This is represented by the following idealized formula:

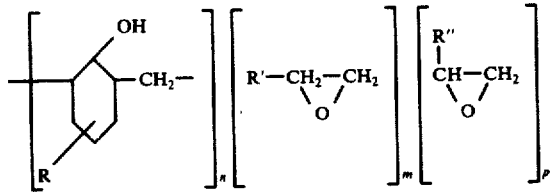

where R is a substituted group, preferably alkyl having about 1–18 carbon atoms, for example from about 1–12 carbon atoms, such as 2–10 carbons, but preferably 4–8. R' is a substituted group, preferably alkyl, having about 2 or more carbons, such as from about 4–30 carbons, for example, about 8–22 carbons, but preferably about 8–18 carbons. R" is hydrogen, methyl or hydroxymethyl.

The value of $n$ can vary widely but in general is from about 2–30 or more units, for example, from about 2–20, but preferably from about 4 to 15.

The value of $m$ for each $n$ unit of the phenol-formaldehyde resin can vary widely depending on the particular resins, the particular α-olefin epoxide, the particular distillate, the amount of alkylene oxide subsequently added, etc. In general, $m$ is from about 0.1 to 10, such as from about 0.2 to 4, for example from about 0.2 to 2, but preferably from about 0.5 to 2. In general, the phenol-formaldehyde resin- α-olefin oxide reaction product is water insoluble but petroleum distillate soluble.

The value of $p$ for each unit of the phenol-formaldehyde resin can vary widely depending on the particular phenol formaldehyde - α-olefin epoxide reaction product, the particular alkylene oxide or combinations thereof, the particular distillate system, etc. In general, it can vary from about 0 to 50, such as from 0 to 20, for example from about 0 to 10, but preferably from about 0.5 to 5. In general, the amount of alkylene oxide should be such as to lower the oil solubility of the phenol-formaldehyde-α-olefin epoxide reaction product so that it has sufficient hydrophilic properties to act as a dehazer.

The α-olefin epoxides of this invention can be illustrated by the idealized formula

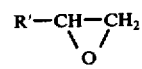

where R' is a substituted group which is preferably aliphatic and most preferably alkyl wherein the alkyl is a higher alkyl, i.e., having about 2 or more carbons such as from about, for example 4 to 30 carbons, for example from about 8–22 carbons, but preferably from about 8–18 carbons. The total number of carbon atoms in the α-olefin epoxide is, of course, two more than in the R' group.

The α-olefin epoxide may be derived from one α-olefin or a mixture of α-olefins.

The lower alkylene oxides are ethylene oxide, glycidol, propylene oxide, or mixtures thereof. R" is hydrogen, hydroxymethyl, or methyl.

The phenol-formaldehyde resins are prepared by reacting formaldehyde or a substance which under the reaction conditions breaks down to formaldehyde, e.g., paraformaldehyde or trioxane, and a difunctional alkylphenol, often for economic reasons preferably a crude mixture of alkylphenols, by heating the reactants above 100° C in the presence of a small amount of an acid catalyst such as sulfamic acid or muriatic acid. A suitable hydrocarbon solvent is added either before heating the reactants or during the course of the resinification. Any water present in the starting materials (e.g. that present in aqueous formaldehyde solution) and the water of reaction are removed by distillation. Heating is continued until no additional aqueous distillate can be collected by further heating. The product is permitted to cool to yield the phenol-formaldehyde condensation product in a hydrocarbon solvent. The molecular weight of these intermediate condensation products cannot be ascertained with certainty, but we would approximate that the resins employed herein should contain about four to 15 phenolic nuclei per resin molecule. The solubility of the condensation product in hydrocarbon solvent would indicate that the resin is a linear type polymer, thus distinguishing them from the more common phenol-formaldehyde resins of the cross-linked type.

Base catalyzed phenol-formaldehyde resins can also be employed in addition to acid catalyzed resins described above. Included among such base-catalyzed resins are the cyclic phenol-formaldehyde resins described in the copending application of Buriks, Fauke and Munch, Ser. No. 172,869 filed Aug. 18, 1973, now abandoned. In contrast to the linear resins which have essentially a linear structure:

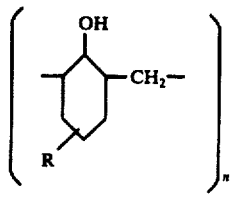

the cyclic structure is

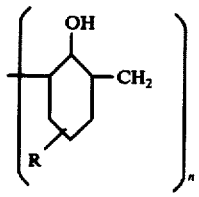

where the circular line indicates a cyclic structure where n = for example 4 to 6 or greater, but preferably n = 4

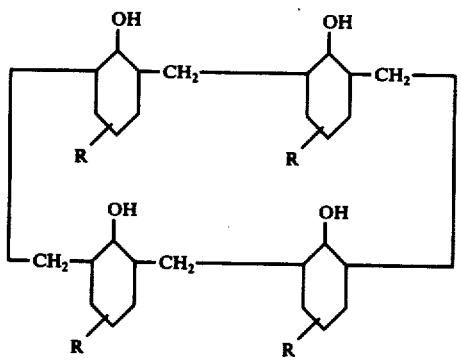

In contrast to the linear resins which are fusible and soluble, the cyclic resins are relatively insoluble in the common solvents and infusible (melting above 300° C).

These cyclic resins are described in said Ser. No. 172,869 which is incorporated herein as if part hereof. Oxyalkylation products of said cyclic resins are described in the copending application of Buriks, Fauke and Mange, Ser. No. 172,917, filed Aug. 18, 1971.

The following examples are presented for purposes of illustration and not of limitation.

EXAMPLE A1

A suspension of 81.3g (0.125 mole) of butyl phenol-formaldehyde cyclic tetramer in 400g of xylene was catalyzed with 7.0g (0.062 mole) of 50% aqueous potassium hydroxide solution by heating at reflux with stirring for 2 hrs. with removal of 4.4 ml $H_2O$ and 21g xylene. To the resulting mixture was added 36 ml (30g 0.13 mole) of α-olefin epoxide 14–16 carbons (mol wgt 240) over a 4 hour period at reflux. The mixture was stirred an additional 2 hours after addition of the epoxide. The molar ratio of butyl tetramer to epoxide of 1/1.

EXAMPLE A2

Example A1 is repeated except that 2 moles of epoxide are added for each mole of butyl tetramer.

EXAMPLE A3

Example A1 is repeated except that 3 moles of epoxide are added for each mole of butyl tetramer.

EXAMPLE A4

Example A1 is repeated except that 4 moles of epoxide are added for each mole of butyl tetramer.

The oxyethylation of the products of Examples A1, A2, A3 and A4 were carried out as follows.

A stirred pressure reactor was charged with the product of one of the above examples plus enough xylene to give the total wt. of starting material specified in the corresponding section of the tables below. The mixture was heated to 130° and ethylene oxide was added in the amount specified. The resulting mixture was stirred for about 2 hrs. at 130°. After removal of a sample as specified, oxide addition was repeated. The cycle of oxide addition, stirring at 130°, and sampling was repeated several times. These examples are summarized in the following tables.

TABLE I

| | Starting Materials | | Ethylene Oxide Added | | Product | | |
|---|---|---|---|---|---|---|---|
| | Wt. (g) | Moles | Wt. (g) | Moles | Total Wt. (g) | Wt. % Active | Sample Removed (g) |
| A1 Butyl Cyclic Tetramer + $C_{14}$–$C_{16}$ α-olefin Epoxide (1M) | | | | | | | |
| a | 508.5 | 0.125 | 21.9 | 0.50 | 530.4 | 25.6 | 83.2 |
| b | 447.2 | 0.105 | 18.4 | 0.42 | 465.6 | 28.5 | 93.5 |
| c | 372.1 | 0.084 | 14.7 | 0.33 | 386.8 | 31.3 | 89.4 |
| d | 297.4 | 0.065 | 11.6 | 0.26 | 309.0 | 33.9 | 86.4 |
| e | 222.6 | 0.047 | 8.3 | 0.19 | 230.9 | 36.2 | |
| A2 Butyl Cyclic Tetramer + $C_{14}$–$C_{16}$ α-olefin Epoxide (2M) | | | | | | | |
| a | 522.5 | 0.100 | 17.6 | 0.40 | 540.1 | 24.6 | 84.4 |
| b | 455.7 | 0.084 | 14.9 | 0.34 | 470.6 | 26.9 | 79.1 |
| c | 391.5 | 0.070 | 12.6 | 0.29 | 404.1 | 29.2 | 73.9 |
| d | 330.2 | 0.057 | 9.9 | 0.22 | 340.1 | 31.3 | 71.0 |
| e | 269.1 | 0.045 | 8.0 | 0.18 | 277.1 | 33.3 | |
| A3 Butyl Cyclic Tetramer + $C_{14}$–$C_{16}$ α-olefin Epoxide (3M) | | | | | | | |
| a | 532.5 | 0.100 | 17.6 | 0.40 | 550.1 | 28.5 | 81.5 |
| b | 468.6 | 0.085 | 15.1 | 0.34 | 483.7 | 30.7 | 76.2 |
| c | 407.5 | 0.072 | 12.6 | 0.29 | 420.1 | 32.8 | 72.6 |
| d | 347.5 | 0.059 | 10.6 | 0.24 | 358.1 | 34.8 | 67.1 |
| e | 291.0 | 0.048 | 8.3 | 0.19 | 299.3 | 36.6 | |
| A4 Butyl Cyclic Tetramer + $C_{14}$–$C_{16}$ α-olefin Epoxide (4M) | | | | | | | |
| a | 542.4 | 0.100 | 17.5 | 0.40 | 559.9 | 32.3 | 82.7 |
| b | 477.2 | 0.085 | 15.1 | 0.34 | 492.3 | 34.3 | 76.8 |
| c | 415.5 | 0.072 | 12.8 | 0.29 | 428.3 | 36.3 | 70.8 |
| d | 357.5 | 0.060 | 10.9 | 0.25 | 368.4 | 38.2 | 70.3 |
| e | 298.1 | 0.049 | 8.2 | 0.19 | 306.3 | 39.8 | |

EXAMPLE B

An acid catalyzed butyl phenol-formaldehyde resin was prepared as follows.

A vessel equipped with a stirrer, water trap with reflux condenser, thermometer, and addition tube reaching close to the bottom of the vessel is charged with 160 parts of a hydrocarbon solvent containing about 78% aromatic hydrocarbons and boiling over a range from approximately 175° to 290° C, 8 parts of a 50% solution of crude alkylnaphthalenesulfonic acids in an aromatic solvent, and 168 parts of crude p-tertiary-butylphenol containing 10.4% kerosene. This mixture is heated to 135° C and stirred to effect solution. Then 89 parts of 37% aqueous formaldehyde solution is added through the addition tube below the surface of the solution while maintaining a temperature of 135° C. Stirring at this temperature is maintained until no more aqueous distillate is being removed, after which 4 parts of 50% caustic soda solution is added followed by 60 parts of aromatic hydrocarbon solvent having approximately the same boiling range as the hydrocarbon solvent originally charged. The solution is heated again to 135° and maintained at this temperature under reduced pressure until no more water can be removed, before cooling to yield the phenol-formaldehyde resin solution in the hydrocarbon vehicle.

EXAMPLE B1

An amount of the butyl phenol formaldehyde resin of Example B (equivalent to 1.2 moles of butyl phenol) and 201g of xylene are placed in a reactor fitted with stirrer, thermometer, addition funnel and Dean Stark trap fitted with Drierite-Ascarite drying tube. 3 mole % of 50% KOH are added and the mixture is heated at reflux for several hours to remove all the water. After lowering the temperature to 130° C, 288g (1.20m) of $C_{14-16}$ α-olefin epoxide was added over a 2 hr. period at this temperature with stirring at 130° C for an additional 4 hrs. after addition. This product was diluted with xylene to 960g (51.1% active, 1.250M/Kg of butyl phenol). It contained 1.60 wgt. of epoxide per wgt. of butyl phenol.

The epoxidized acid catalyzed resin of Example B1 was oxyethylated with varying amounts of ethylene oxide according to the same procedure used in Examples A.

The results are presented in the following table.

TABLE II

| | Starting Materials | | Eto Added | | Products | | | |
|---|---|---|---|---|---|---|---|---|
| | Total Wt. (g) | Moles Phenol | Wt. (g) | Moles | EtO Level | Total Wt. (g) | Wt. % Active | Sample Removed (g) |
| a | 478.0 | 0.500 | 21.8 | 0.49 | 0.29 | 499.8 | 45.3 | 61.5 |
| b | 438.3 | 0.438 | 19.5 | 0.44 | 0.59 | 457.8 | 47.6 | 62.1 |
| c | 395.7 | 0.379 | 16.6 | 0.38 | 0.88 | 412.3 | 49.7 | 60.1 |
| d | 352.2 | 0.324 | 14.4 | 0.33 | 1.17 | 366.6 | 51.7 | 58.4 |
| e | 308.2 | 0.272 | 12.1 | 0.27 | 1.47 | 320.3 | 53.5 | |

In order to evaluate the effectiveness of these compositions as dehazer additives, the standard 80/20 shake test was used.

80 ml of gasoline containing all additives (i.e., corrosion inhibitor; carburetor antiicer) but without dehazer was added to 100 ml stoppered graduates. The dehazer is then added, using a 1% solution so that low concentrations can be tested. The sample is thoroughly agitated to mix in the dehazer. 20 ml of distilled water is then added and the samples are shaken for two minutes. Water clarity and gasoline brightness are noted after 5 minutes. A blank containing no dehazer is run in each set to determine the amount of improvement.

The test is then repeated with water buffered at pH 10, 7 and 5.

The amount of dehazer required will vary with the particular dehazer and the detergent formulations present in gasoline. In general, the range of about 0.1 to 50 ppm or more, such as from about 1 to 40 ppm, but preferably from about 10 to 30 ppm of dehazer is employed.

Tables III through V summarize the data obtained for various gasoline, detergent compositions (A, B, C), and dehazers in distilled, and buffered waters.

TABLE III

Test results using distillates with 20 ppm dehazer

| Gasoline | Dehazer Example | Gasoline Brightness | Water Clarity | Interface |
|---|---|---|---|---|
| A | — | poor | poor | poor |
| A | A1c | excellent | excellent | excellent |
| A | A4e | excellent | excellent | good |
| A | B1a | excellent | excellent | excellent |
| B | — | good | fair | poor |
| B | A1c | excellent | excellent | excellent |
| B | A4e | excellent | fair | fair |
| B | B1a | excellent | excellent | excellent |
| C | — | fair | poor | poor |
| C | A1d | excellent | excellent | excellent |
| C | A4b | excellent | fair | poor |
| C | B1b | excellent | excellent | excellent |

TABLE IV

Test results using gasoline B with 20 ppm dehazer and various buffered waters

| | Dehazer of Example | | | |
|---|---|---|---|---|
| pH 10.0 | None | A4c | A3b | B1a |
| gasoline brightness | good | excellent | excellent | excellent |
| water clarity | good | excellent | good | excellent |
| interface | fair | excellent | excellent | good |
| pH 7.0 | | | | |
| gasoline brightness | good | excellent | excellent | excellent |
| water clarity | fair | excellent | fair | good |
| interface | poor | excellent | excellent | excellent |
| pH 5.0 | | | | |
| gasoline brightness | poor | excellent | excellent | excellent |
| water clarity | poor | excellent | good | good |
| interface | poor | good | fair | good |

TABLE 5

Test results using gasoline B and distilled water at various concentrations of the dehazer of example B1a (ppm)

| Dehazer Concentration | Gasoline Brightness | Water Clarity | Interface |
|---|---|---|---|
| None | good | fair | poor |
| 1 | excellent | good | poor |
| 5 | excellent | excellent | fair |
| 10 | excellent | excellent | good |
| 15 | excellent | excellent | excellent |
| 20 | excellent | excellent | excellent |
| 30 | excellent | excellent | excellent |
| 50 | excellent | excellent | excellent |
| 100 | excellent | excellent | excellent |

The compositions of this invention possess many other uses than that of dehazing. Other uses include the following:
1. W/O Demulsifiers
2. Surface active agents
3. Desalting aids, etc.

Various modifications of the invention can be made in light of the foregoing disclosure without departing from the spirit of the invention.

We claim:
1. A fuel composition comprising a distillate fuel and a dehazing amount of the product of the process which comprises reacting a phenol-formaldehyde resin with an α-olefin epoxide having at least four carbon atoms and then reacting the product so obtained with a member of the group consisting of ethylene oxide, glycidol, propylene oxide and mixtures thereof, the reaction of said phenol-formaldehyde resin with said α-olefin epoxide and the reaction of the product so obtained with said member being carried out by heating the respective reaction mixtures.

2. The fuel composition of claim 1 wherein said phenol-formaldehyde resin contains 2 to 30 recurring units of the formula

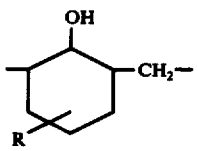

where R is an alkyl group of from 1 to 18 carbon atoms and about 0.1 to 10 moles of said α-olefin epoxide and about 1.5 to 50 moles of said member are used for each said recurring unit phenol-formaldehyde resin.

3. The fuel composition of claim 2 wherein said phenol-formaldehyde resin contains 4 to 15 recurring units of said formula and about 0.5 to 2 moles of said α-olefin epoxide and about 0.5 to 5 moles of said member are used for each said recurring unit.

4. The fuel composition of claim 2 wherein the reaction of said phenol-formaldehyde resin with said α-olefin epoxide is carried out in the presence of potassium hydroxide.

5. The fuel composition of claim 2 wherein said α-olefin epoxide is represented by the formula:

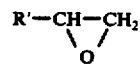

where R' is an alkyl group of a least four carbon atoms.

6. The fuel composition of claim 5 wherein said alkyl group contains 8 to 18 carbon atoms.

7. The fuel composition of claim 2 wherein said phenol-formaldehyde resin is butyl phenol-formaldehyde resin.

8. The fuel composition of claim 2 wherein said member is ethylene oxide.

9. The fuel composition of claim 5 wherein said member is ethylene oxide.

10. The fuel composition of claim 6 wherein said member is ethylene oxide.

11. The fuel composition of claim 3 wherein said phenol-formaldehyde resin is butyl phenol-formaldehyde resin, said α-olefin epoxide is represented by the formula:

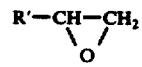

where R' is an alkyl group containing 8 to 18 carbon atoms, the reaction of said phenol-formaldehyde resin with said α-olefin epoxide is carried out in the presence of potassium hydroxide and said member is ethylene oxide.

* * * * *